Sept. 19, 1933.  A. C. WERNER  1,927,600
ICE CREAM CONE CARRIER
Filed Jan. 6, 1933  2 Sheets-Sheet 1
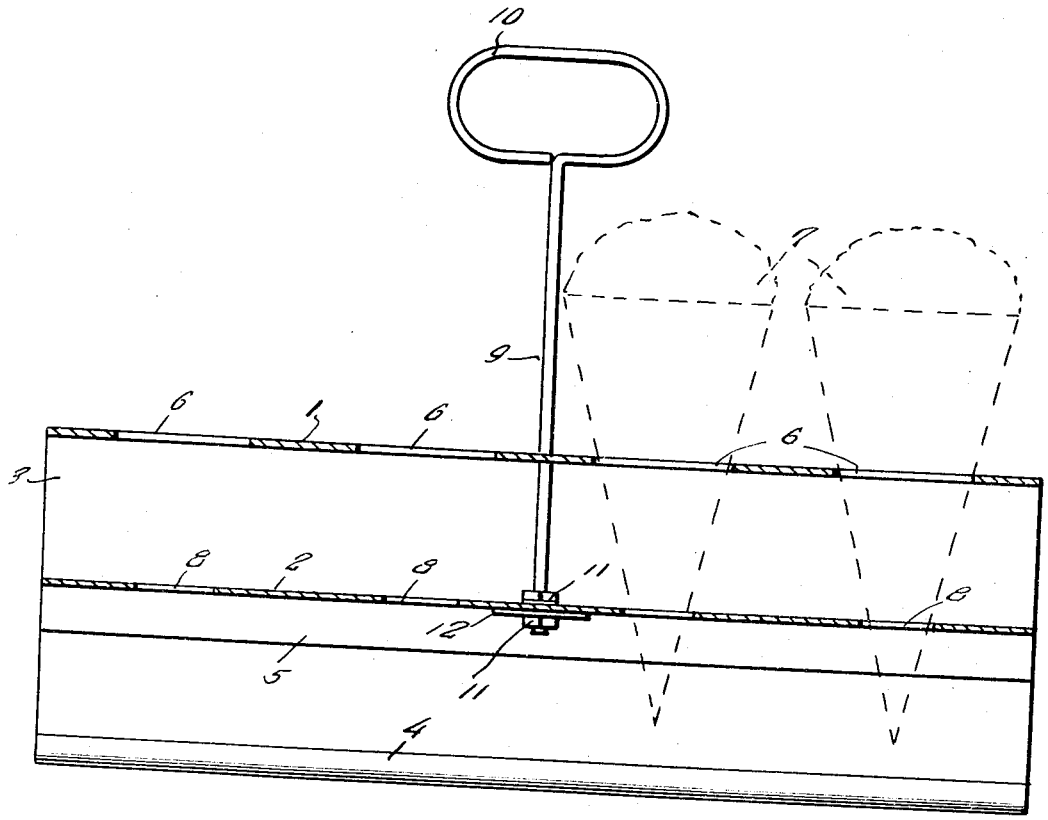
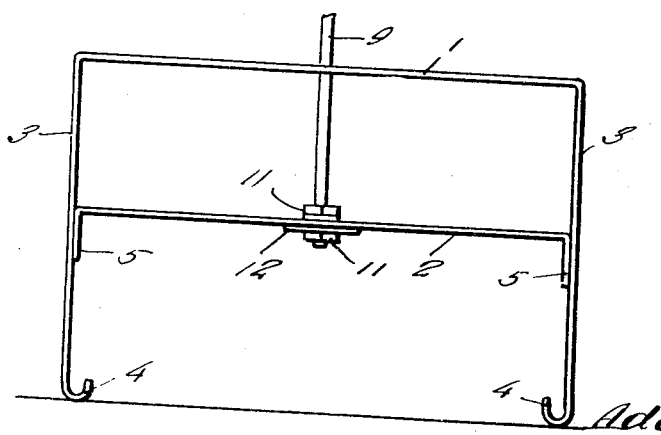
Inventor
Adolph C. Werner
By Clarence A. O'Brien
Attorney Sept. 19, 1933.  A. C. WERNER  1,927,600
ICE CREAM CONE CARRIER
Filed Jan. 6, 1933   2 Sheets-Sheet 2
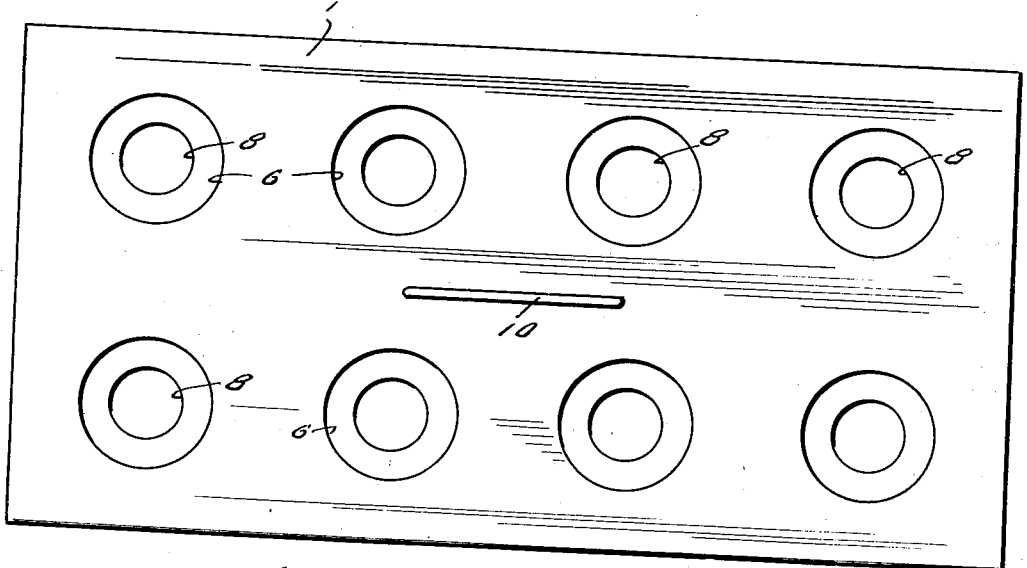
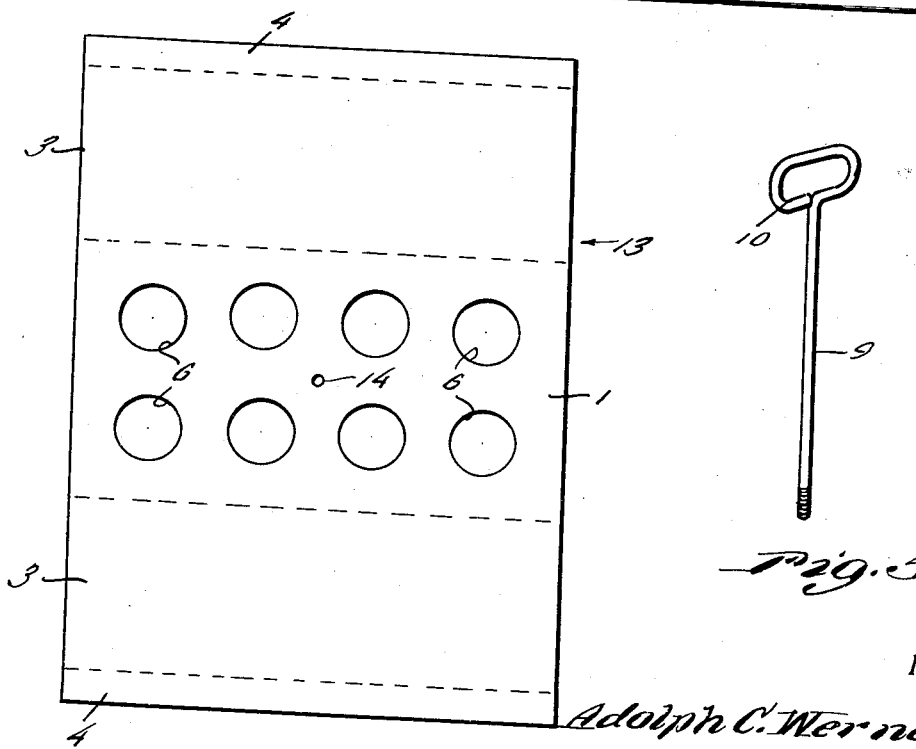
Inventor
Adolph C. Werner
By Clarence A. O'Brien
Attorney Patented Sept. 19, 1933

1,927,600

UNITED STATES PATENT OFFICE 1,927,600

ICE CREAM CONE CARRIER

Adolph Christian Werner, High Ridge, Mo.

Application January 6, 1933. Serial No. 650,560

1 Claim. (Cl. 224—48)

The present invention relates to new and useful improvements in ice cream cone carriers and has for its primary object to provide, in a manner as hereinafter set forth, a device of this character embodying a novel construction, combination and arrangement of parts through the medium of which a plurality of cones may be conveniently carried in an attractive and sanitary manner.

Other objects of the invention are to provide an ice cream cone carrier of the aforementioned character which will be simple in construction, strong, durable, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a view in vertical longitudinal section through an ice cream cone carrier constructed in accordance with the present invention.

Figure 2 is a view in end elevation thereof.

Figure 3 is a top plan view.

Figure 4 is a plan view of the blank from which the major portion of the carrier is formed.

Figure 5 is a detail view in perspective of the handle or supporting member.

Referring now to the drawings in detail, it will be seen that the embodiment of the invention which has been illustrated comprises vertically spaced upper and lower plates 1 and 2, respectively, of any suitable material, preferably aluminum. Depending from the longitudinal sides of the upper plate 1 are supporting flanges 3 which terminate, at their lower ends, in inwardly and upwardly curved lips constituting feet 4. The lower plate 2 is provided, at its longitudinal sides, with comparatively short down-turned flanges 5 which abut the flanges 3 and which are secured thereto in any suitable manner, as by soldering, welding or riveting for mounting the lower plate in position between said flanges 3 in spaced relation beneath the upper plate 1.

The upper plate 1 has formed therein a plurality of openings 6 for the reception of the ice cream cones two of which are indicated in broken lines in Figure 1 of the drawings and designated by the reference numeral 7. The lower plate 2 is provided with comparatively small openings 8 in vertical alignment with the openings 6 for receiving the comparatively small lower portions of the ice cream cones, as will be apparent.

The reference numeral 9 designates a rod which extends vertically through openings provided therefor centrally in the upper and lower plates 1 and 2, said rod terminating, at its upper end, in a handle 10. The lower end portion of the rod 9 is threaded for receiving securing nuts 11 above and below the lower plate 2, a comparatively large washer 12 being interposed between said plate 2 and the lowermost nut.

It will thus be seen that the rod 9 may be expeditiously secured in position or removed, thus facilitating shipping and assembling of the carrier. From a consideration of Figure 4 of the drawings, it will also be noted that the plate 1, the supporting flanges 3 and the feet 4 are formed from a blank comprising a single sheet of material, said blank being designated by the reference numeral 13. In the blank 13, the opening which accommodates the rod 9 is indicated at 14.

It is believed that the many advantages of an ice cream cone carrier constructed in accordance with the present invention will be readily understood, and although the preferred embodiment of the invention is as illustrated and described, it is to be understood that changes in the details of construction and in the combination and arrangement of parts may be resorted to which will fall within the scope of the invention as claimed.

What is claimed is:—

A device for carrying ice cream cones comprising a plate provided with longitudinally extending rows of holes, a pair of downwardly extending flanges connected to the side edges of the plate and having their lower edges curved upwardly to form rounded supporting feet, a second plate spaced below the first plate and having short flanges at its side edges fastened to the inner faces of the first mentioned flanges, said second plate having rows of holes therein, each of which is of smaller diameter than the holes in the first plate and said holes in the second plate being vertically alined with the holes in the first plate to receive the small ends of the cones placed in the large holes of the first plate, a handle rod passing through the central part of the first plate and through the central part of the second plate and nuts carried by the rod and engaging portions of the upper and lower faces of said second plate.

ADOLPH CHRISTIAN WERNER.